(12) United States Patent
Mallikarjuna

(10) Patent No.: US 10,983,949 B2
(45) Date of Patent: Apr. 20, 2021

(54) FILE SYSTEM QUOTA VERSIONING

(71) Applicant: Red Hat, Inc., Raleigh, NC (US)

(72) Inventor: Vijaikumar Mallikarjuna, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 1018 days.

(21) Appl. No.: 15/056,772

(22) Filed: Feb. 29, 2016

(65) Prior Publication Data

US 2017/0249304 A1    Aug. 31, 2017

(51) Int. Cl.
*G06F 16/11*    (2019.01)
*G06F 16/182*    (2019.01)

(52) U.S. Cl.
CPC .......... *G06F 16/11* (2019.01); *G06F 16/122* (2019.01); *G06F 16/182* (2019.01)

(58) Field of Classification Search
CPC ...... G06F 16/11; G06F 16/182; G06F 16/122; G06F 3/0644
USPC ....................................................... 707/827
See application file for complete search history.

(56) References Cited

U.S. PATENT DOCUMENTS

| 5,956,734 | A * | 9/1999 | Schmuck | G06F 16/1858 |
| 7,406,473 | B1 | 7/2008 | Brassow et al. | |
| 7,836,230 | B1 * | 11/2010 | Wong | G06F 3/0671 |
| | | | | 710/53 |
| 7,900,015 | B2 | 3/2011 | Fachan et al. | |
| 7,962,532 | B1 * | 6/2011 | Pogde | G06F 16/122 |
| | | | | 707/825 |
| 8,165,994 | B2 * | 4/2012 | Carnathan | G06F 16/2358 |
| | | | | 707/648 |
| 8,190,583 | B1 * | 5/2012 | Shekar | G06Q 30/04 |
| | | | | 707/688 |
| 8,515,904 | B1 | 8/2013 | Dwyer, III et al. | |

(Continued)

FOREIGN PATENT DOCUMENTS

EP    3333732 A1 *    6/2018    ......... G06F 16/2365

OTHER PUBLICATIONS

Microsoft documentation on Network File System "https://docs.microsoft.com/en-us/windows-server/storage/nfs/nfs-overview" (Year : 2018).*

(Continued)

*Primary Examiner* — Ashish Thomas
*Assistant Examiner* — Abdullah A Daud
(74) *Attorney, Agent, or Firm* — Womble Bond Dickinson (US) LLP

(57) ABSTRACT

A system and method for handling file system quotas are disclosed. In one implementation, a processing device receives a first command to disable a quota capability of a file system. In response, one or more instructions are initiated to delete a first association of a quota attribute with a directory, where the first association assigns a first value to a first string comprising a combination (e.g., concatenation, etc.) of an attribute name and a first symbol. Prior to completion of the execution of the one or more instructions, one or more commands are received to enable the quota capability and assign a second value of the quota attribute to the directory. In response, a second association of the quota attribute with the directory is generated, the second association assigning a second value of the quota attribute to a second string comprising a combination of the attribute name and a second symbol.

20 Claims, 3 Drawing Sheets

(56) References Cited

U.S. PATENT DOCUMENTS

| | | | | | |
|---|---|---|---|---|---|
| 8,589,336 | B1* | 11/2013 | Levy | ................ | G06F 3/0484 |
| | | | | | 707/602 |
| 8,745,222 | B2 | 6/2014 | Chi et al. | | |
| 8,924,364 | B1* | 12/2014 | Zhong | ................ | G06F 16/13 |
| | | | | | 707/690 |
| 9,146,689 | B2 | 9/2015 | Rogers et al. | | |
| 9,201,896 | B2 | 12/2015 | Darcy et al. | | |
| 2005/0193023 | A1* | 9/2005 | Ismail | ................ | H04N 21/4147 |
| 2006/0069665 | A1* | 3/2006 | Yamakawa | ......... | H04L 67/1097 |
| 2006/0117135 | A1* | 6/2006 | Thind | ................ | G06F 3/0653 |
| | | | | | 711/112 |
| 2006/0179037 | A1* | 8/2006 | Turner | ................ | G06F 16/1844 |
| 2007/0073741 | A1* | 3/2007 | Fredrickson | .............. | G06F 8/22 |
| 2007/0266218 | A1* | 11/2007 | Achiwa | ................ | G06F 3/0665 |
| | | | | | 711/170 |
| 2008/0208926 | A1* | 8/2008 | Smoot | ................ | G06F 16/217 |
| 2009/0070620 | A1* | 3/2009 | Chiang | ................ | G11B 20/18 |
| | | | | | 714/2 |
| 2012/0136888 | A1* | 5/2012 | Mahmoud | ............ | G06F 9/4413 |
| | | | | | 707/769 |
| 2015/0089065 | A1 | 3/2015 | Kasso et al. | | |
| 2015/0143112 | A1* | 5/2015 | Yavuz | ................ | G06F 21/6227 |
| | | | | | 713/165 |
| 2015/0347272 | A1* | 12/2015 | Berk | ................ | G06F 11/3636 |
| | | | | | 717/128 |
| 2016/0171055 | A1* | 6/2016 | Erickson | ................ | G06F 11/30 |
| | | | | | 707/723 |
| 2016/0242024 | A1* | 8/2016 | Karren | ................ | H04W 4/60 |
| 2017/0249304 | A1* | 8/2017 | Mallikarjuna | ........ | G06F 16/122 |
| 2018/0322137 | A1* | 11/2018 | Todd | ................ | G06F 16/178 |

OTHER PUBLICATIONS

"Configuring Quotas", Lustre 1.8 Operations Manual, 2010, 8 pages, Oracle; downloaded from http://wiki.old.lustre.org/manual/LustreManual18_HTML/ConfiguringQuotas.html on Dec. 22, 2015.

"Managing Directory Quota", Docs, Administrator Guide, Direcotry Quota, 5 pages; downloaded from http://gluster-documentation-trial.readthedocs.io/en/latest/Administrator%20Guide/Directory%20Quota/ on Dec. 22, 2015.

* cited by examiner

FILE SYSTEM QUOTA VERSIONING

TECHNICAL FIELD

This disclosure relates to computer systems, and more particularly, to file system quotas.

BACKGROUND

A file system quota (also referred to as a "disk quota" or "storage quota") is a limit set by a system administrator that restricts certain aspects of file system usage on modern operating systems. A first type of quota, known as a usage quota or block quota, limits the amount of storage space that can be used. A second type of quota, known as a file quota or inode quota, limits the number of files and directories that can be created. File system quotas may be implemented on a per-directory basis.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
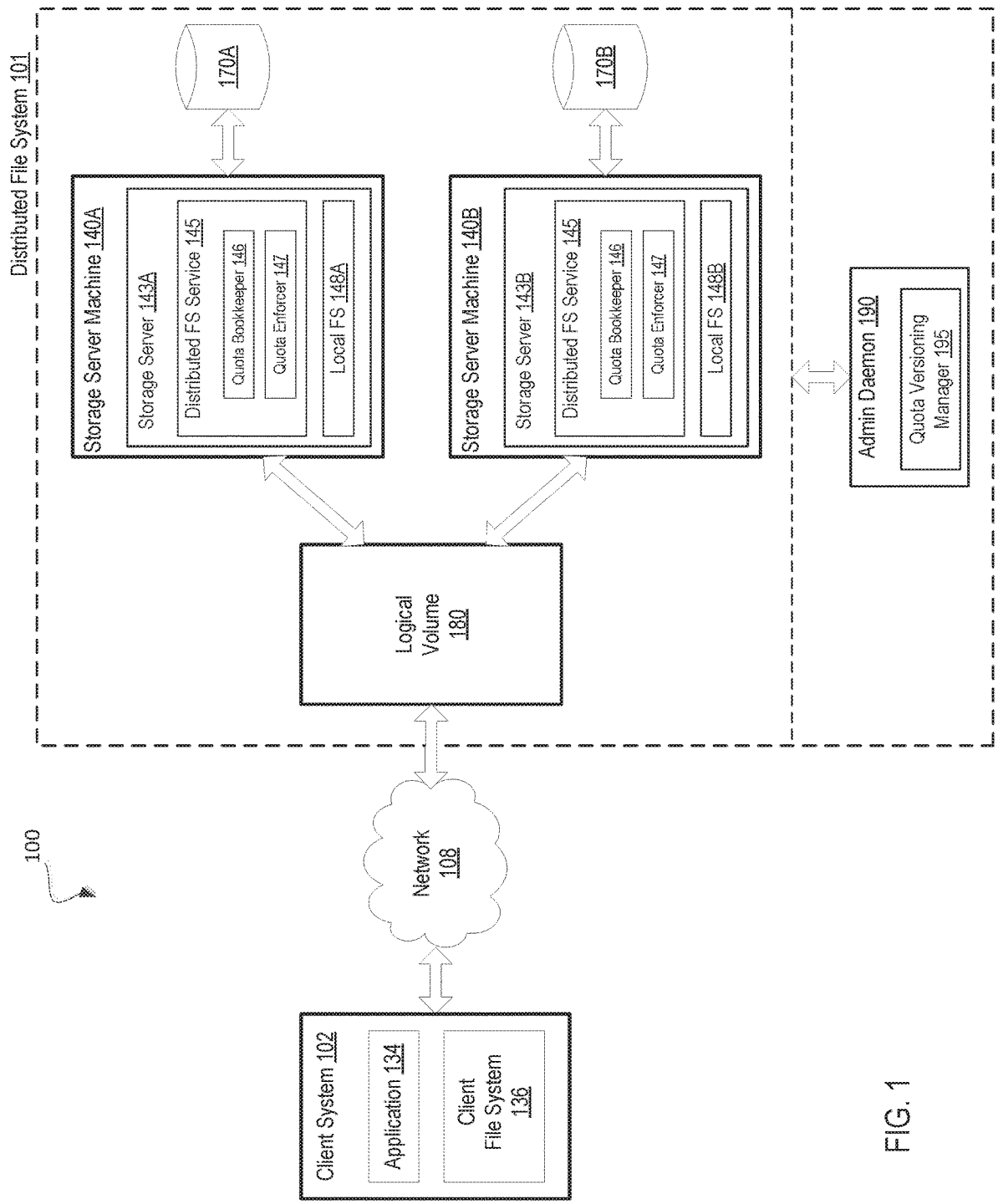
FIG. 1 depicts an illustrative computer system architecture, in accordance with an embodiment of the present disclosure.

In multi-user computer systems, a file system may be accessed simultaneously by a plurality of users. Similarly, a plurality of users may simultaneously access a quota capability of the file system. Such access may include enabling and disabling of the quota capability.

Enabling a quota capability may involve establishing quota attributes for directories of the file system. Quota attributes can specify a maximum amount of storage space that is permitted to be used for a directory, a maximum number of files that is permitted to be included in a directory. Similarly, disabling the quota capability may involve removing the quota attributes from every directory in the file system. Such removal can take time, particularly in distributed file systems where network latency may introduce delays. Consequently, if a first user submits a first command to disable the quota capability, and a second user subsequently submits a second command to enable the quota capability before the attribute removal process of the disabling has completed, there may be a collision between the establishment of and removal of a quota attribute. For example, even though the second command to enable the quota capability is submitted after the first command to disable the quota capability, an attribute may be removed by the first command after the attribute has been set by the second command. Accordingly, in conventional systems, a user or system administrator should wait until disabling has completed before the quota capability can be safely re-enabled.

Aspects of the present disclosure address the above and other deficiencies of the conventional systems. Described herein is a system and method for handling the disabling and enabling of a file system's quota capability that do not suffer from the above problem. In accordance with one embodiment, a processing device receives a first command to disable a quota capability of a file system, where the quota capability associates quota attributes with directories of the file system. In response to the first command, the processing device initiates execution of one or more instructions to delete a first association of a quota attribute with a directory, where the quota attribute has an attribute name, and where the first association assigns a first value of the quota attribute to a first string, and where the first string comprises a combination (e.g., a concatenation) of the attribute name and a first symbol. Prior to completion of the execution of the one or more instructions, the processing device receives one or more commands to enable the quota capability and assign a second value of the quota attribute to the directory. In response to the one or more commands, the processing device generates a second association of the quota attribute with the directory, where the second association assigns a second value of the quota attribute to a second string, and where the second string comprises a combination (e.g., a concatenation) of the attribute name and a second symbol.

In one example, the first symbol comprises one or more characters representing an integer N, and the second symbol comprises one or more characters representing an integer N+1. For example, the first association of the quota attribute with a directory might be represented by the string "<attribute name>.1=<value1>", where <attribute name> denotes the name of the quota attribute (e.g., not the literal string "<attribute name>") and <value1> denotes a first value assigned to the quota attribute for the particular directory (e.g., not the literal string "<value1>"). Similarly, the second association of the quota attribute with the directory might be represented by the string "<attribute name>.2=<value2>", where <value2> denotes a second value assigned to the quota attribute for the particular directory (e.g., not the literal string "<value2>"). It should be noted that in some implementations, the symbol may be combined with the attribute name in an alternative manner (e.g., by prepending the symbol rather than appending the symbol, by using a separator other than ".", by concatenating without a separator, by embedding the symbol within the attribute name, etc.).

In one embodiment, a counter is incremented each time the quota capability is enabled, and the counter is used to generate successive versions of quota attributes. In some implementations, a character string corresponding to the current value of the counter is used as the symbol concatenated with the attribute name. For example, the first time the quota capability is enabled, quota attributes for a directory might be represented by the strings "<attribute name>.1"; the second time the quota capability is enabled the quota attributes for the directory might be represented by "<attribute name>.2"; the tenth time the quota capability is enabled the quota attribute for the directory might be represented by "<attribute name>.10"; and so on.

As noted above, disabling of the quota capability may involve removing quota attributes from every directory in the file system, which can take time, particularly in distributed file systems where network latency can introduce delays. By employing versioning of the quota attributes, the quota capability may be enabled following a disabling of the quota capability without having to wait for the disabling to complete. In particular, while the disabling removes the existing versions of the quota attributes, the enabling creates new versions of the quota attributes and therefore does not interfere with the removing of the existing versions. Accordingly, the disabling and enabling processes can be executed simultaneously. After the disabling and enabling processes have been completed, there will be exactly one version of each attribute/directory pair. Consequently, the file system will be in a state that allows the versioning technique to be repeated for the next disabling and subsequent re-enabling of the quota capability. It should be noted that the versioning technique also works correctly in instances where the one or more commands to re-enable the quota capability are not submitted until after the disabling process has completed.

In one embodiment, the quota attributes for a directory may include a limit on the size of the directory e.g., 5.0 MB, etc.), the current size of the directory (e.g., 2.4 megabytes [MB], etc.), and the size of the directory's contribution to its parent directory. In one example, the attribute name for the limit is trusted.glusterfs.quota.limit-set, and the value of this attribute comprises a first 16-digit hexadecimal string representing a hard limit (e.g., a maximum that cannot be exceeded) followed by a second 16-digit hexadecimal string representing a soft limit (e.g., a limit that is less than the hard limit and that, when exceeded, results in a warning that the hard limit is close to being hit). In one example, the attribute name for the current size is trusted.glusterfs.quota.size, and the value of this attribute comprises a 16-digit hexadecimal string representing the size in bytes and a 16-digit binary string representing a directory count (e.g., the number of subdirectories contained in the directory plus 1, where the plus 1 counts the directory itself in the directory count. In one example, the attribute name for the directory's contribution to its parent directory is trusted.glusterfs.quota.<parent dir ID>.contri, and the value of this attribute comprises a 16-digit hexadecimal string representing the contribution in bytes and a 16-digit binary string representing a directory count, as described above.

FIG. 1 depicts an illustrative system architecture 100 for various implementations of the disclosure. It should be noted that other architectures are possible, and that the implementation of a system utilizing embodiments of the disclosure are not necessarily limited to the specific architecture depicted by FIG. 1.

The system architecture 100 may include a distributed file system 101 coupled to one or more client machines 102 via a network 108. A distributed file system 101 is a client/server based system that allows clients to access and process data stored on storage servers as if it were on their own computer. The network 108 may be a public network (e.g., the Internet), a private network (e.g., a local area network (LAN) or wide area network (WAN)), or a combination thereof. Network 108 may include a wireless infrastructure, which may be provided by one or multiple wireless communications systems, such as a wireless fidelity (WiFi) hotspot connected with the network 108 and/or a wireless carrier system that can be implemented using various data processing equipment, communication towers, etc.

The distributed file system 101 may be a network attached storage file system that includes a logical volume 180 and one or more storage server machines 140A-B, each of which may control and manage any number of storage resources 170A-B. It should be noted that the fact that two server machines 140 and two storage resources 170 are depicted in FIG. 1 is merely illustrative; distributed file system 101 may have a fewer or greater number of storage server machines 140, and a fewer or greater number of storage resources 170.

A storage server machine 140A-B may include a network-accessible server-based functionality (e.g., storage server 143A-B) or other data processing equipment. The storage server machines 140A-B may include, but are not limited to, any data processing device, such as a desktop computer, a laptop computer, a mainframe computer, a personal digital assistant, a rack-mount server, a hand-held device or any other device configured to process data. The storage server machines 140A-B of the distributed file system 101 may be grouped into one or more clusters. A cluster may be a group of linked storage servers 143A-B working together closely.

The storage resources 170A-B may be mass storage devices, such as magnetic or optical storage based disks, solid-state drives (SSDs) or hard drives, coupled to the storage server machines 140A-B (either directly or via the network 108). The storage resources 170A-B may also include memory such as random access memory (RAM), Flash memory, and so forth. For convenience, some embodiments provided herein may be described with reference to disks or other mass storage devices. However, it should be understood that such embodiments may also apply to memory storage resources.

Storage servers 143A-B may each host a local file system that manages the storage of data on storage resources 170A-B. Each of the storage resources 170A-B may be formatted in accordance with a particular local file system (FS) 148A-B. The local FS 148A-B may create directories, partitions, logical volumes, and so forth on the storage resources 170A-B as well as store data (e.g., files) thereon. Examples of local disk file systems that may be used on disk storage resources include, but are not limited to, EXT3, EXT4, XFS, NTFS, FAT16, FAT32, and so forth. Various flash file systems, tape file systems, optical disc file systems, memory files systems and so on may alternatively be used for other non-disk storage resources (e.g., for memory storage resources).

Storage servers 143A-B may each additionally include an instance of a distributed file system (FS) service 145. The distributed FS service 145 interfaces with local file systems 148A-B to store files on the storage resources 170A-B, as well as allow retrieval of stored files to the client system 102. The distributed file system service 145 instances additionally interface with one another to form the distributed file system 101.

The distributed file system services 145, and thus the distributed file system 101, may store data as files and may include directories, also referred to as folders, which are virtual containers within the distributed file system 101, in which groups of computer files and possibly other directories may be kept and organized. The distributed file system 101 may organize data (e.g., files) in the disks 170A-B using volumes. A volume may be a single accessible storage area of the distributed file system 101 that may be resident on a single partition or directory of a hardware resource 170A-B (e.g., of a hard disk) of the file system 101. A volume may be a representation of a logical location, rather than a physical location, of a storage area in the file system 101. For example, a physical hard disk-1 may have two partitions, partition-1 and partition-2. A volume label "C:" may be assigned to partition-1, and a volume label "D:" may be assigned to partition-2. Hard disk-1 is a physical disk, and "C:" and "D:" are volumes representing logical locations on physical hard disk-1. Additionally, the volume may be a collection of multiple logical and/or physical locations.

In some embodiments, a volume of the distributed file system 101 may be associated with multiple storage servers and storage resources 170A-B. Files of a volume may be stored across the storage resources 170A-B. For example, a volume label "C:" may be assigned to a partition or portion of a first storage resource 170A and a partition or portion of a second storage resource 170B. As such, files of a single volume may be distributed between multiple storage resources 170A-B that are managed by multiple storage servers 140A-B. Thus, files of a volume may be stored across one or more storage servers. In some embodiments, the files of the volume may be distributed across multiple directories (e.g., a hierarchical path) that are associated with multiple storage servers.

In some embodiments, distributed file system 145 may include a quota bookkeeper 146 and a quota enforcer 147. The quota bookkeeper 146 may keep track of changes in the size of files, creation of new files, deletion of files, etc., and may propagate these changes up the directory hierarchy. The quota enforcer 147 may monitor distributed file system 145 for violations of soft or hard quotas and take appropriate action (e.g., notify the owner of a directory and/or a system administrator that the quota has been violated, etc.).

Any number of client systems 102 may include a client file system 136 to communicate with the storage servers 143A-B in the distributed file system 101. The client system 102 may be a computing device such as a server computer, a desktop computer, a set-top box, a gaming console, a television, a portable computing device such as, and not limited to, mobile telephones, personal digital assistants (PDAs), portable media players, netbooks, laptop computers, electronic book reader, and the like. The client machines 102 may host one or more applications 134. An application 134 may be any type of application including, but not limited to, a web application, a desktop application, a browser application, etc. An application 134 may request access (e.g., read, write, etc.) to the data in the distributed file system 101. For example, the application 134 may request to read or write files stored in a volume associated with storage resources 170A-B.

In one embodiment, distributed file system 101 may include an admin daemon 190 (e.g., a background process, etc.) that is capable of receiving commands from a system administrator (e.g., via a shell command console window, via a graphical user interface (GUI) of an administration application, etc.). The commands may include creating directories, deleting files, navigating through the file system (e.g., via a change directory command), enabling and disabling a quota capability, setting values of quota attributes, and so forth. In one implementation, admin daemon 190 may include a quota versioning manager 195 that is capable of managing multiple versions of quota attributes. Some operations of quota versioning manager 195 are described in detail below with respect to FIG. 2. It should be noted that although implementations of the present disclosure are described in the context of distributed file systems, implementations of the present disclosure may also be employed for other types of file systems (e.g., centralized file systems, etc.).

Figure 2:
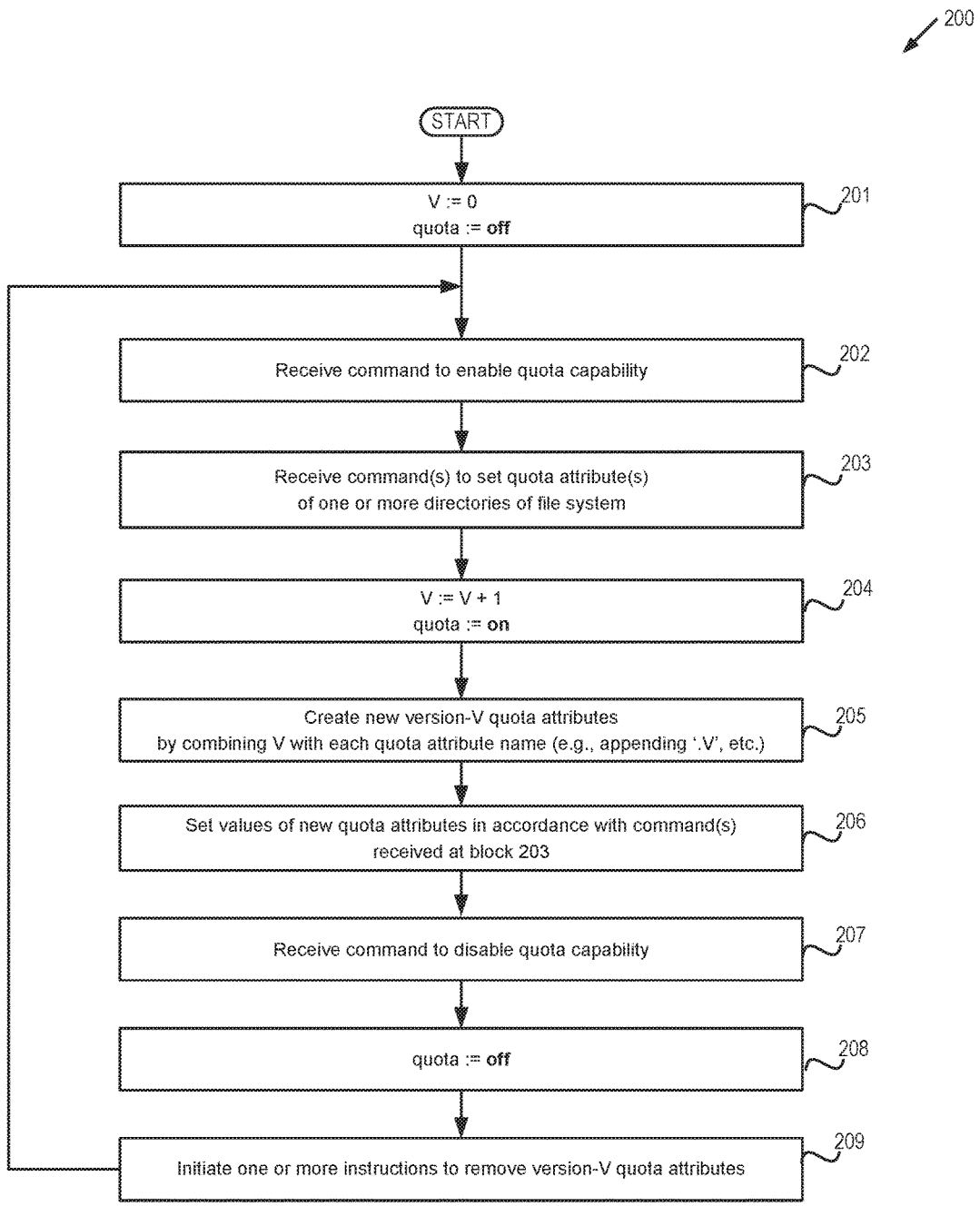
FIG. 2 depicts a flow diagram of one embodiment of a method by which a computer system handles disabling and enabling of file system quotas.

FIG. 2 depicts a flow diagram of one embodiment of a method 200 by which a computer system handles disabling and enabling of file system quotas. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1 (e.g., by quota versioning manager 193), while in some other embodiments, some or all of the method might be performed by another machine. It should be noted that in some embodiments blocks depicted in FIG. 2 may be performed simultaneously or in a different order than that depicted.

At block 201, a counter V is initialized to zero, and a flag quota is initialized to the value off. Counter V may represent the current version of quota attributes. At block 202, a command is received to enable a quota capability of a file system (e.g., of distributed filed system 101 of FIG. 1, etc.). The command may be submitted by a system administrator, a user, an automated script that runs according to a schedule, etc. At block 203, one or more commands are received to set one or more quota attributes of one or more directories of the file system. It should be noted that the one or more commands received at block 203 may be submitted by the same entity that submitted the command at block 202, or may be received by some other entity. It should be further noted that in some implementations, the quota capability may associate quota attributes with one or more volumes of a file system, either in addition to or instead of the directory quotas. Similarly, in some implementations, the quota capability may also associate quota attributes with individual files.

At block 204, counter V is incremented and flag quota is set to on. At block 205, new version-V quota attributes are created by combining counter V with each attribute name (e.g., appending ".V" to the end of each quota attribute name, etc.), indicating that the quota attributes are version V. At block 206, values of the new quota attributes are set in accordance with the command(s) received at block 203.

A command to disable the quota capability is subsequently received at block 207 (e.g., at some point while the quota capability is enabled, etc.). The command may be submitted by a system administrator, a user, an automated script, etc., and may be the same as, or different than, the entity (or entities) that submitted the enabling commands of blocks 202 and 203.

At block 208, flag quota is set to off in response to the command. At block 209, one or more instructions are initiated to remove the version-V quota attributes. In some examples, a process may be spawned to execute the one or more instructions, while in some other examples a thread may be created to execute the one or more instructions.

As noted above, in some other implementations another type of naming scheme might be used for modifying quota attribute names. For example, rather than a counter, a flag may be toggled back and forth (e.g., the first version of an attribute name might be "<attribute name>0.0", the second version of the attribute name might be "<attribute name>0.1", the third version of the attribute name might be "<attribute name>0.0", the fourth version of the attribute name might be "<attribute name>0.1", and so on). Similarly, in some examples the symbols used to modify the quota attribute names might be something other than numerals (e.g., "<attribute name>.a", "<attribute name>.b", etc.), whether used in a toggling fashion or in a sequential ordering. As noted above, in some implementations the naming scheme might combine attribute names with symbols in some fashion other than concatenation.

Figure 3:
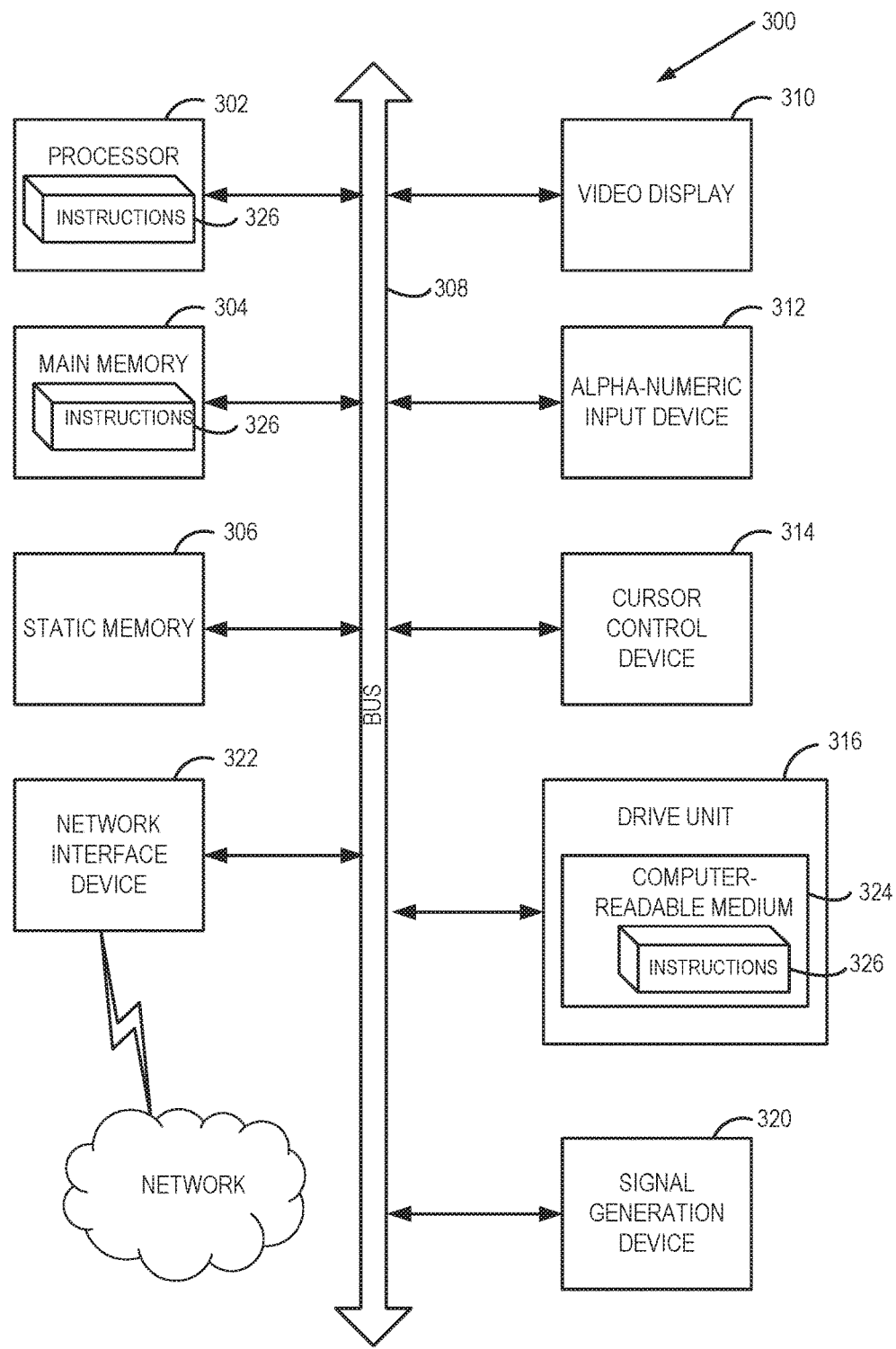
FIG. 3 depicts a block diagram of an illustrative computer system operating in accordance with embodiments of the disclosure.

FIG. 3 depicts an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 300 includes a processing system (processor) 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 306.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 326 for performing the operations and steps discussed herein.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable medium 324 on which is stored one or more sets of instructions 326 (e.g., instructions corresponding to the method of FIG. 2, etc.) embodying any one or more of the methodologies or functions described herein. Instructions 326 may also reside, completely or at least partially, within the main memory 304 and/or within the processor 302 during execution thereof by the computer system 300, the main memory 304 and the processor 302 also constituting computer-readable media. Instructions 326 may further be transmitted or received over a network via the network interface device 322.

While the computer-readable storage medium 324 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "receiving", "initiating", "generating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   initializing a version counter to zero, wherein the version counter indicates a current version of a quota attribute associated with a file system;
   receiving, by a processing device, a first command from a first user of the file system to disable a quota capability of the file system, wherein the quota capability associates quota attributes with directories of the file system;
   identifying, in response to the first command, a first association of a quota attribute with a plurality of directories in view of a first quota attribute string, wherein the first quota attribute string comprises a combination of an attribute name and a first symbol corresponding to a first version of the quota attribute, the first version corresponding to the current version of the quota attribute indicated by the version counter, and wherein the first association assigns a first value of the quota attribute to the first quota attribute string;
   initiating by the processing device, in response to the first command, execution of one or more instructions to delete the first association of the quota attribute with the plurality of directories in view of the first quota attribute string;
   receiving by the processing device, prior to completion of the execution of the one or more instructions to delete the first association, a second command from a second user of the file system to enable the quota capability and assign a second value of the quota attribute to the plurality of directories;
   in response to the second command, incrementing the version counter, wherein the current version of the quota attribute is one greater than an immediately prior version of the quota attribute; and
   in response to the second command, enabling the quota capability concurrently with the execution of at least one of the one or more instructions to delete the first association of the quota attribute, wherein enabling the quota capability comprises:
      generating, by the processing device, a second association of the quota attribute with the directory, wherein the second association assigns a second value of the quota attribute to a second quota attribute string, and wherein the second quota attribute string comprises a combination of the attribute name and a second symbol corresponding to a second version of the quota attribute, wherein the second quota attribute string is different from the first quota attribute string to allow for generation of the second association of the quota attribute with the directory prior to deletion of the first association of the quota attribute with the directory.

2. The method of claim 1 wherein the first symbol comprises one or more characters representing an integer N, and wherein the second symbol comprises one or more characters representing an integer N+1.

3. The method of claim 1 wherein the quota attribute is a size of the directory.

4. The method of claim 1 wherein the quota attribute is a limit on a size of the directory.

5. The method of claim 1 wherein the quota attribute is a contribution of a size of the directory to a size of a parent directory of the directory.

6. The method of claim 1 wherein the quota capability also associates quota attributes with one or more volumes of the file system.

7. The method of claim 1 wherein the combination of the attribute name and the first symbol is a concatenation.

8. An apparatus comprising: a memory; one or more non-transitory storage devices to store a file system; and a computer processing device, operatively coupled to the one or more storage devices and the memory, to: initialize a version counter to zero, wherein the version counter indicates a current version of a quota attribute associated with a file system; receive a first command from a first user of the file system to disable a quota capability of the file system, wherein the quota capability associates quota attributes with directories of the file system;
   identify, in response to the first command, a first association of a quota attribute with a plurality of directories in view of a first quota attribute string, wherein the first quota attribute string comprises a combination of an attribute name and a first symbol corresponding to a first version of the quota attribute, the first version corresponding to the current version of the quota attribute indicated by the version counter, and wherein the first association assigns a first value of the quota attribute to the first quota attribute string;
   initiate, in response to the first command, execution of one or more instructions to delete the first association of the quota attribute with the plurality of directories in view of the first quota attribute string;
   receive, prior to completion of the execution of the one or more instructions to delete the first association, a second command from a second user of the file system to enable the quota capability and assign a second value of the quota attribute to the plurality of directories;
   in response to the second command, increment the version counter, wherein the current version of the quota attribute is one greater than an immediately prior version of the quota attribute; and
   in response to the second command, enable the quota capability concurrently with the execution of at least one of the one or more instructions to delete the first association of the quota attribute, wherein to enable the quota capability the processing device is to:
   generate a second association of the quota attribute with the directory, wherein the second association assigns a second value of the quota attribute to a second quota attribute string, and wherein the second quota attribute string comprises a combination of the attribute name and a second symbol corresponding to a second version of the quota attribute, wherein the second quota attribute string is different from the first quota attribute string to allow for generation of the second association of the quota attribute with the directory prior to deletion of the first association of the quota attribute with the directory.

9. The apparatus of claim 8 wherein the first symbol comprises one or more characters representing an integer N, and wherein the second symbol comprises one or more characters representing an integer N+1.

10. The apparatus of claim 8 wherein the quota attribute is a size of the directory.

11. The apparatus of claim 8 wherein the quota attribute is a limit on a size of the directory.

12. The apparatus of claim 8 wherein the quota attribute is a contribution of a size of the directory to a size of a parent directory of the directory.

13. The apparatus of claim 8 wherein the quota capability also associates quota attributes with one or more volumes of the file system.

14. The apparatus of claim 8 wherein the combination of the attribute name and the first symbol is a concatenation.

15. A non-transitory computer readable storage medium, having instructions stored therein, which when executed, cause a processing device to:
   initialize a version counter to zero, wherein the version counter indicates a current version of a quota attribute associated with a file system;
   receive a first command from a first user of the file system to disable a quota capability of the file system, wherein the quota capability associates quota attributes with directories of the file system;
   identify, in response to the first command, a first association of a quota attribute with a plurality of directories in view of a first quota attribute string, wherein the first quota attribute string comprises a combination of an attribute name and a first symbol corresponding to a first version of the quota attribute, the first version corresponding to the current version of the quota attribute indicated by the version counter, and wherein the first association assigns a first value of the quota attribute to the first quota attribute string;
   initiate, in response to the first command, execution of one or more instructions to delete the first association of the quota attribute with a plurality of directories in view of the first quota attribute string;
   receive, prior to completion of the execution of the one or more instructions to delete the first association, a second command from a second user of the file system to enable the quota capability and assign a second value of the quota attribute to the plurality of directories;
   in response to the second command, increment the version counter, wherein the current version of the quota attribute is one greater than an immediately prior version of the quota attribute; and
   in response to the second command, enabling the quota capability concurrently with the execution of at least one of the one or more instructions to delete the first association of the quota attribute, wherein to enable the quota capability the processing device is to:
      generate by the processing device, in response to the second command, a second association of the quota attribute with the directory, wherein the second association assigns a second value of the quota attribute to a second quota attribute string, and wherein the second quota attribute string comprises a combination of the attribute name and a second symbol corresponding to a second version of the quota attribute, wherein the second quota attribute string is different from the first quota attribute string to allow for generation of the second association of the quota attribute with the directory prior to deletion of the first association of the quota attribute with the directory.

16. The non-transitory computer readable storage medium of claim 15 wherein the first symbol comprises one or more characters representing an integer N, and wherein the second string comprises a second combination of the attribute name and a second symbol, and wherein the second symbol comprises one or more characters representing an integer N+1.

17. The non-transitory computer readable storage medium of claim 15 wherein the quota attribute is a size of the directory.

18. The non-transitory computer readable storage medium of claim 15 wherein the quota attribute is a limit on a size of the directory.

19. The non-transitory computer readable storage medium of claim 15 wherein the quota attribute is a contribution of a size of the directory to a size of a parent directory of the directory.

20. The non-transitory computer readable storage medium of claim 15 wherein the combination of the attribute name and the first symbol is a concatenation.

* * * * *